US010462844B2

(12) United States Patent
Yeo et al.

(10) Patent No.: US 10,462,844 B2
(45) Date of Patent: Oct. 29, 2019

(54) DYNAMIC PACKET RELAY APPARATUS AND METHOD FOR SENSOR NETWORK

(71) Applicant: Electronics and Telecommunications Research Institute, Daejeon-si (KR)

(72) Inventors: Geon Min Yeo, Daejeon-si (KR); Young Il Kim, Daejeon-si (KR); Yong Tae Lee, Daejeon-si (KR); Dae Geun Park, Daejeon-si (KR); Sun Hwa Lim, Daejeon-si (KR); Won Ryu, Seoul (KR)

(73) Assignee: ELECTRONICS AND TELECOMMUNICATIONS RESEARCH INSTITUTE, Daejeon-si (KR)

( * ) Notice: Subject to any disclaimer, the term of this patent is extended or adjusted under 35 U.S.C. 154(b) by 457 days.

(21) Appl. No.: 15/071,721

(22) Filed: Mar. 16, 2016

(65) Prior Publication Data

US 2016/0277948 A1 Sep. 22, 2016

(30) Foreign Application Priority Data

Mar. 16, 2015 (KR) ........................ 10-2015-0036158

(51) Int. Cl.
*H04W 84/20* (2009.01)
*H04L 29/06* (2006.01)
(Continued)

(52) U.S. Cl.
CPC ............ *H04W 84/20* (2013.01); *H04L 69/22* (2013.01); *H04L 69/40* (2013.01); *H04W 4/70* (2018.02);
(Continued)

(58) Field of Classification Search
CPC ..... H04W 84/20; H04W 4/70; H04W 40/248; H04W 40/22; H04W 88/04; H04L 69/40; H04L 69/22; H04B 7/155
See application file for complete search history.

(56) References Cited

U.S. PATENT DOCUMENTS 9,819,560 B2 * 11/2017 Lin ........................ H04L 43/065
2005/0075084 A1 * 4/2005 Salokannel ............. H04L 45/00
455/126

(Continued)

FOREIGN PATENT DOCUMENTS

| KR | 10-0718094 | 5/2007 |
| KR | 10-2012-0019951 | 3/2012 |
| KR | 10-1331591 | 1/2014 |

OTHER PUBLICATIONS

Youling Zhou et al., "A Low-latency GTS Strategy in IEEE802.15.4 for Industrial Applications", Second International Conference on Future Generation Communication and Networking, 2008, pp. 411-414.

(Continued)

*Primary Examiner* — Mounir Moutaouakil
(74) *Attorney, Agent, or Firm* — Kile Park Reed & Houtteman PLLC

(57) ABSTRACT

A dynamic packet relay method of a personal area network (PAN) coordinator in a sensor network includes receiving a Child_Register message that includes information about a device associated with a coordinator and building or updating a network hierarchical structure; monitoring reception of a packet or a beacon from the coordinator and determining whether the coordinator is defective or not; and in response to a determination that the coordinator is defective, changing the current coordinator to one of devices belonging to a PAN as a new coordinator.

17 Claims, 20 Drawing Sheets

(51) Int. Cl.
  *H04W 4/70*   (2018.01)
  *H04L 29/14*   (2006.01)
  *H04W 40/24*   (2009.01)
  *H04W 88/04*   (2009.01)
  *H04B 7/155*   (2006.01)
  *H04W 40/22*   (2009.01)

(52) U.S. Cl.
  CPC ............ *H04W 40/248* (2013.01); *H04B 7/155* (2013.01); *H04W 40/22* (2013.01); *H04W 88/04* (2013.01)

(56) References Cited

U.S. PATENT DOCUMENTS

| | | |
|---|---|---|
| 2005/0097409 A1 | 5/2005 | Shin et al. |
| 2007/0064625 A1 | 3/2007 | Lim et al. |
| 2007/0088473 A1 | 4/2007 | Moon et al. |
| 2010/0061272 A1* | 3/2010 | Veillette .................. H04L 45/34 370/254 |
| 2011/0063999 A1* | 3/2011 | Erdmann ............... H04W 84/18 370/254 |
| 2011/0134827 A1* | 6/2011 | Hooli .................... H04W 72/04 370/315 |
| 2012/0110055 A1* | 5/2012 | Van Biljon ............ G06Q 30/04 709/201 |
| 2014/0148100 A1* | 5/2014 | Kim .................. H04W 72/0406 455/41.2 |
| 2015/0181502 A1* | 6/2015 | Hans ..................... H04W 40/22 455/437 |
| 2016/0183271 A1* | 6/2016 | Zhou ..................... H04B 17/309 370/315 |
| 2016/0330713 A1* | 11/2016 | Vijayasankar ...... H04W 72/005 |
| 2016/0360499 A1* | 12/2016 | Ito .................... H04W 56/0015 |

OTHER PUBLICATIONS

IEEE802.15.4, "Part 15.4: Low-Rate Wireless Personal Area Networks (LR-WPANs)", IEEE Std 802.15.4™-2011, Sep. 5, 2011, pp. 1~314.

* cited by examiner

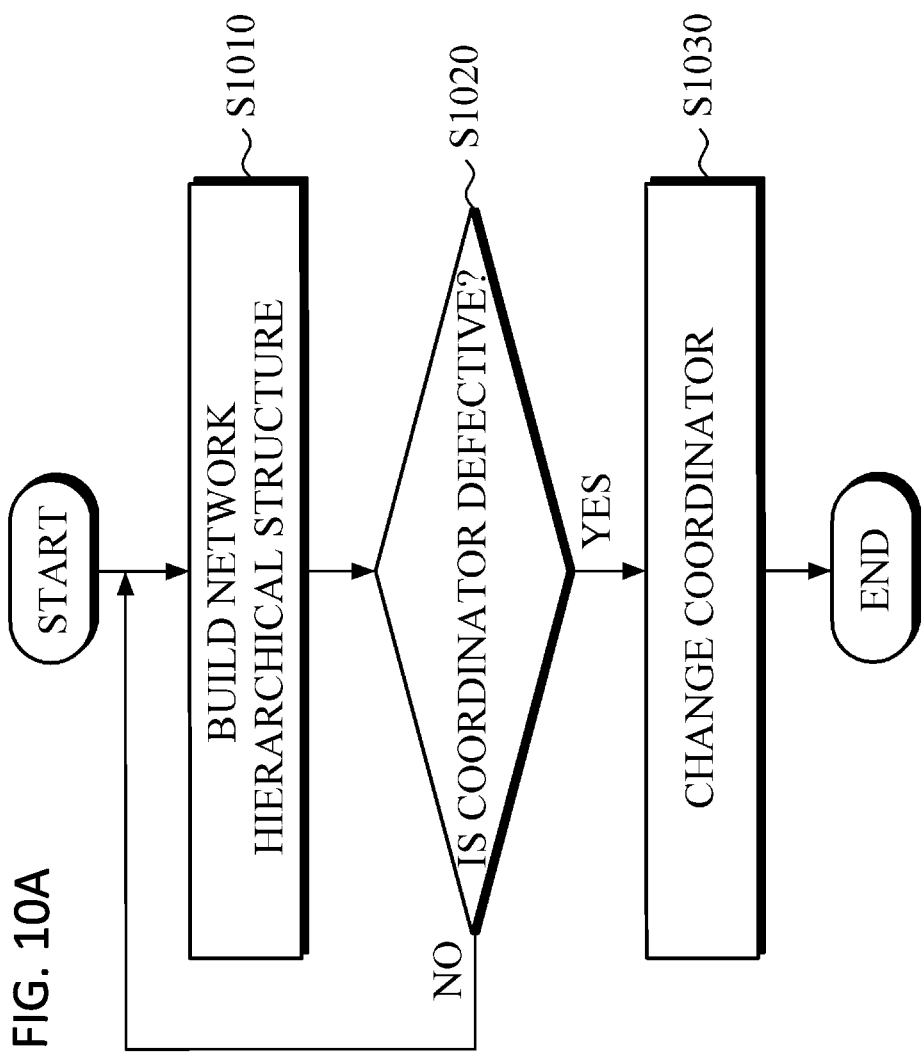

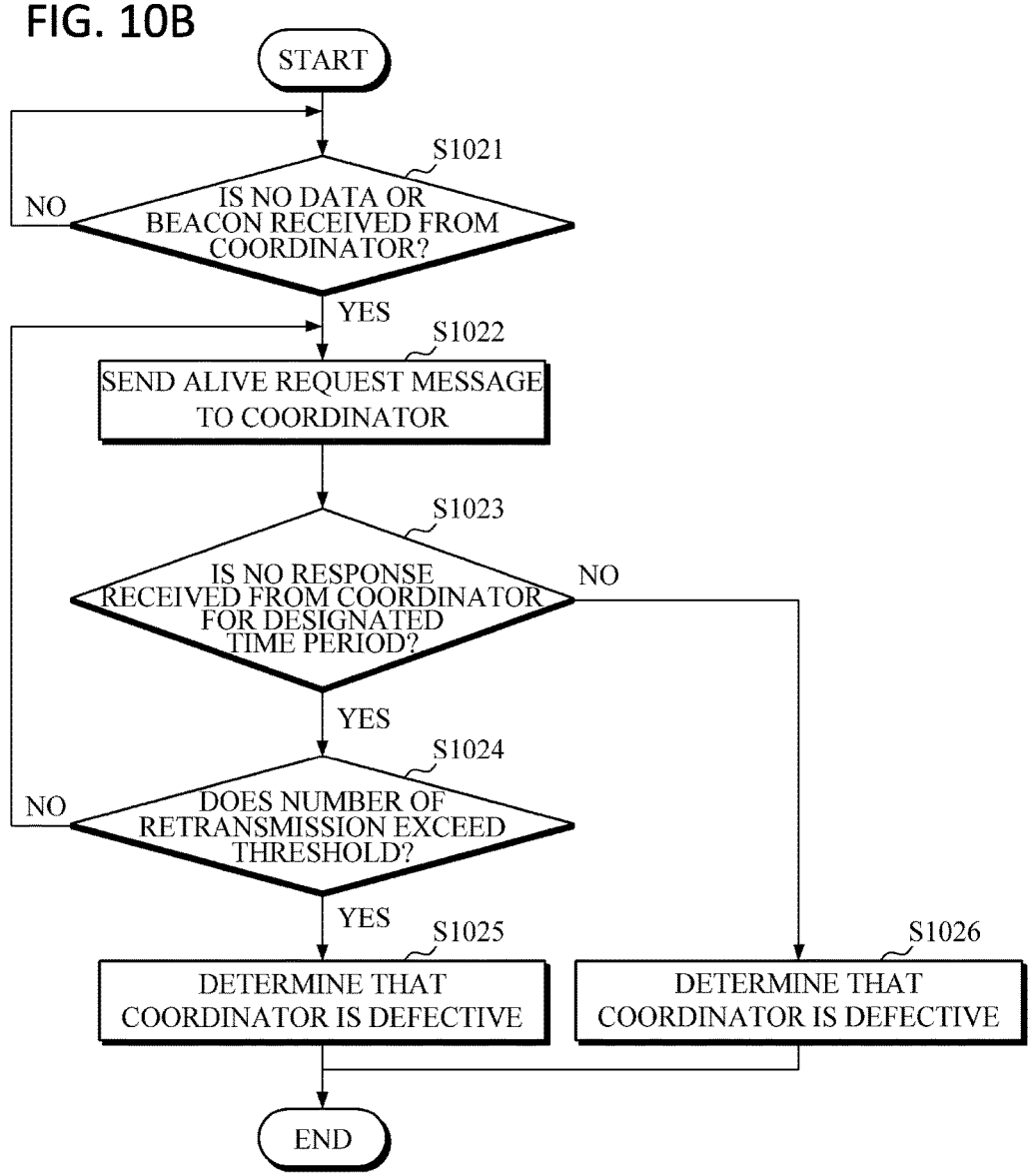

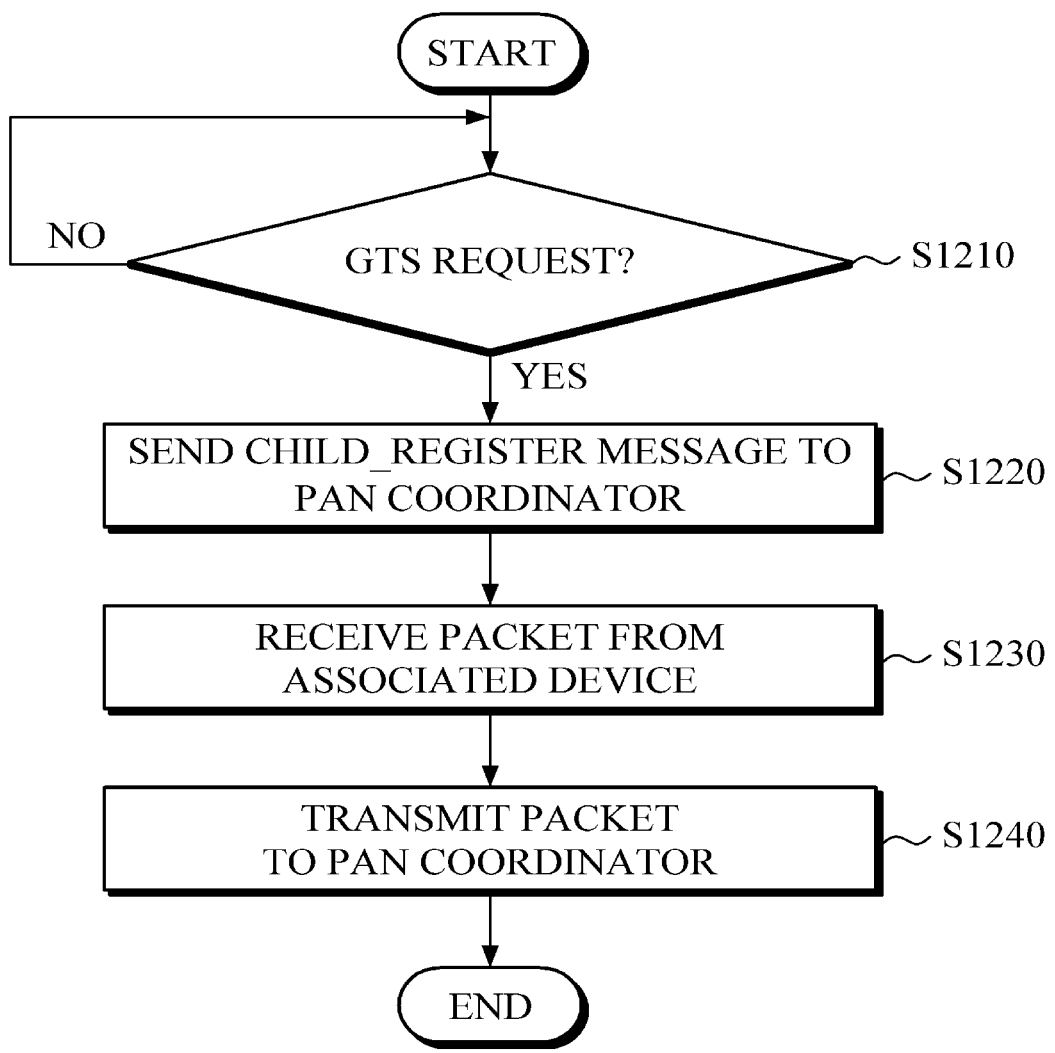

US 10,462,844 B2

DYNAMIC PACKET RELAY APPARATUS AND METHOD FOR SENSOR NETWORK

CROSS-REFERENCE TO RELATED APPLICATION(S)

This application claims priority from Korean Patent Application No. 10-2015-0036158, filed on Mar. 16, 2015, in the Korean Intellectual Property Office, the disclosure of which is incorporated herein by reference in its entirety.

BACKGROUND

1. Field

The following description relates to a sensor communication service, and more particularly, to a packet relay apparatus and method for a sensor communication.

2. Description of Related Art

A sensor network is a type of wireless network that transmits sensing information generated by a sensor to the final transmission via wireless communications. The sensor network is based on a lower data transfer rate compared to a mobile telecommunication network, and supplying it with power by cables is difficult; as such, the sensor network generally operates on battery.

The IEEE802.15.4 is the archetypal international standard for wireless sensor communications and network configuration. According to the IEEE802.15.4, a total of 16 5-MHz channels are each operated at a 2.4 GHz band. One personal area network (PAN) can be formed in each channel, and serve as a basic unit of a sensor network. A PAN coordinator manages one PAN, and multiple devices or coordinators may be connected to the PAN coordinator.

The PAN coordinator transmits a beacon at regular time intervals, and one time interval between beacons forms one wireless frame. One wireless frame is composed of an active period during which data transmission/reception is enabled, and an inactive period during which data transmission/reception is disabled.

SUMMARY

One object of the following description is to provide dynamic packet relay that achieves the stabilization of communication quality by allowing for transmission of final sensor data even in the instance where a coordinator failure occurs or a communication is impossible.

Without the method suggested by the following description, in an environment where a coordinator is inevitably employed due to geographical factors, any communication failures that occur when the coordinator operates unstably may not be overcome, and some sensor may not ensure the stable transmission of their sensor data in an environment where the replacement of equipment during the operation is not easy, such as the equipment in trains in operation.

The coordinator may serve as a relay device to cope with a transmission distance between a sensor and a personal area network (PAN) coordinator. An available wireless period for the coordinator is an inactive period of a PAN coordinator. According to IEEE802.154 technologies, however, the operation of guaranteed time slot (GTS), which is a dedicated channel for the coordinator, is not supported, and in the instance of a failure in communication with the coordinator due to a defect of the coordinator, sensors linked to said coordinator cannot easily transmit data to the PAN coordinator.

In one general aspect, there is provided a dynamic packet relay method of a personal area network (PAN) coordinator in a sensor network, the dynamic packet relay method including: receiving a Child_Register message that includes information about a device associated with a coordinator and building or updating a network hierarchical structure; monitoring reception of a packet or a beacon from the coordinator and determining whether the coordinator is defective or not; and in response to a determination that the coordinator is defective, changing the current coordinator to one of devices belonging to a PAN as a new coordinator.

In another general aspect, there is provided a dynamic packet relay method of a device associated with a PAN coordinator in a sensor network, the dynamic packet relay method including: receiving a Coordinator_Candidate Request message from a PAN coordinator, the Coordinator_Candidate Request message containing coordinator information and information about a device associated with a coordinator; sending a Coordinator_Candidate Response message to the PAN coordinator, wherein the Coordinator_Candidate Response message contains information regarding a packet which has been received during an inactive period, the packet being transmitted to the coordinator from the device associated with the coordinator; and in response to receiving a Coordinator Request message from the PAN coordinator, changing a mode to serve as a coordinator from a following frame.

In yet another general aspect, there is provided a dynamic packet relay method of a coordinator in a sensor network, including: sending a Child_Register message to a PAN coordinator, the Child Register message containing information about a device associated with the coordinator; receiving a packet from the associated device after transmitting a beacon to the device during an inactive period of the PAN coordinator; and transmitting the packet to the PAN coordinator during an active period of the PAN coordinator.

In still another general aspect, there is provided a dynamic packet relay method of a device associated with a coordinator in a sensor network, the dynamic packet relay method including: in response to no beacon being received from the coordinator, standing by for a designated period of time to receive a beacon; in response to receiving a beacon, determining whether the beacon was sent from the coordinator or another device; and in response to a determination that the beacon was sent from another device, updating coordinator information based on information about the device.

In still yet another general aspect, there is provided a dynamic packet relay apparatus of a PAN coordinator including: a relay hierarchy generator configured to receive a Child_Register message that contains information about a device associated with a coordinator, and build or update a network hierarchical structure; a coordinator checker configured to monitor reception of a beacon or data from the coordinator to determine whether the coordinator is defective or not; and a coordinator changer configured to, in response to a determination that the coordinator is defective, change the current coordinator to one of devices belonging to a personal area network as a new coordinator.

In yet another general aspect, there is provided a dynamic packet relay apparatus of a device associated with a PAN coordinator, including: a candidate request receiver configured to receive a Coordinator_Candidate Request message that contains coordinator information and information about a device associated with a coordinator from the PAN coordinator; a candidate response sender configured to send a Coordinator_Candidate Response message to the PAN coordinator, wherein the Coordinator_Candidate Response message contains information regarding a packet which has been received during an inactive period, the packet being transmitted to the coordinator from a device associated with the coordinator; and a mode changer configured to, in response to receiving a Coordinator Request message from the PAN coordinator, change a mode of the device to serve as a coordinator from the following frame.

In yet another general aspect, there is provided a dynamic packet relay apparatus of a coordinator, including: a device registration component configured to send a Child_Register message that contains information about a device associated with the coordinator to a PAN coordinator; a relay packet receiver configured to transmit a beacon to the associated device and receive, in turn, a packet from the device during an inactive period of the PAN coordinator; and a relay packet transmitter configured to transmit the packet to the PAN coordinator during an active period of the PAN coordinator.

In yet another general aspect, there is provided a dynamic packet relay apparatus of a device associated with a coordinator, including: a beacon checker configured to, in response to no beacon being received from the associated coordinator, stand by for a predetermined time period to receive a beacon, and in response to a beacon being received, determine whether the received beacon was sent from the coordinator or another device; and a coordinator updater configured to, in response to a determination that the beacon was sent from another device, updating coordinator information based on information about the device.

Other features and aspects will be apparent from the following detailed description, the drawings, and the claims.

BRIEF DESCRIPTION OF THE DRAWINGS

FIG. 10A is a flowchart illustrating a dynamic packet relay method performed by a PAN coordinator in a sensor network according to an exemplary embodiment.

FIG. 10B is a flowchart illustrating in detail the operation of FIG. 10 for determining whether a coordinator is defective or not.

FIG. 12 is a flowchart illustrating a dynamic packet relay method performed by a coordinator in a sensor network according to an exemplary embodiment.

Figure 1:
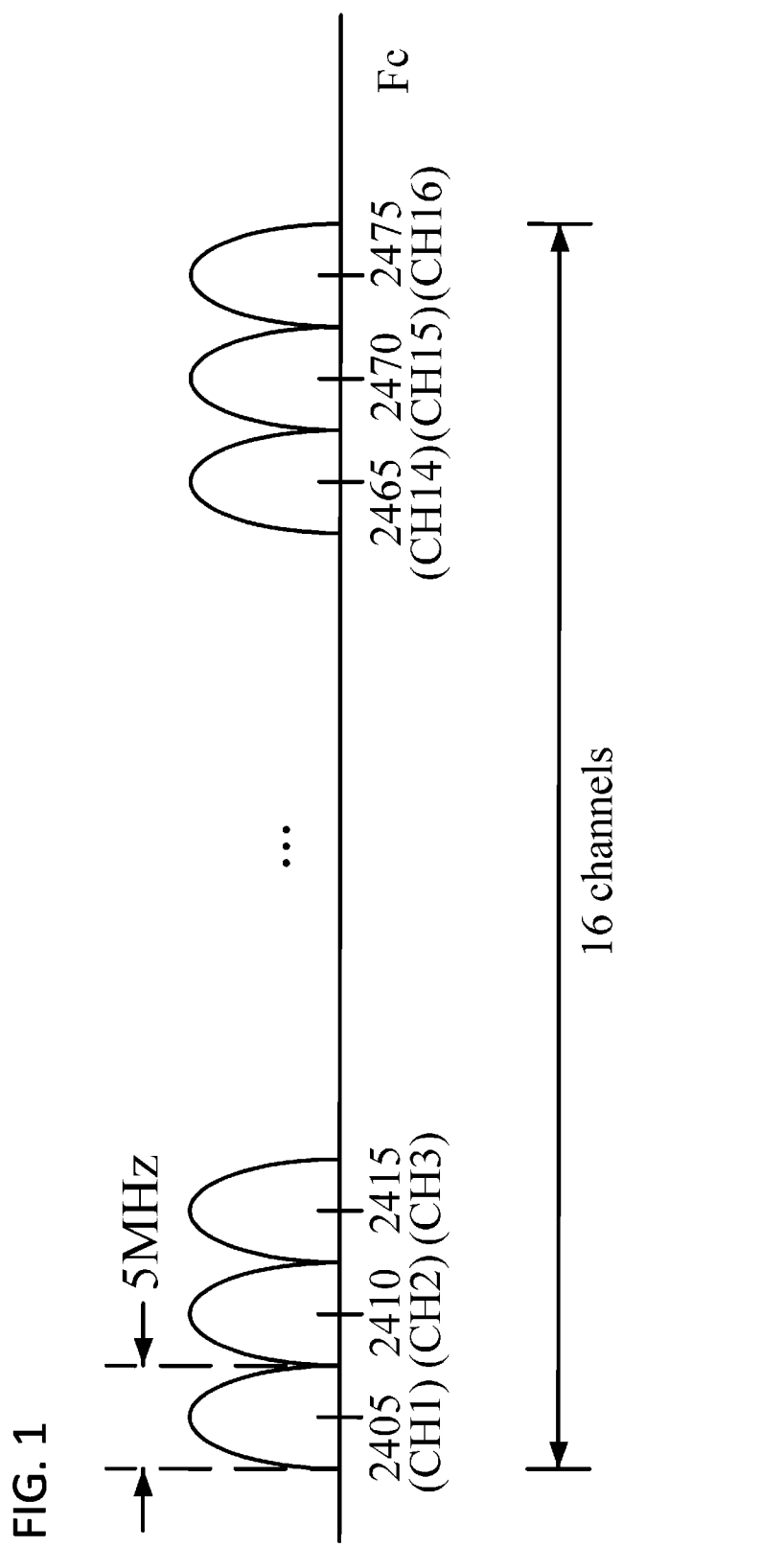
FIG. 1 is a diagram illustrating an example of IEEE802.15.4 channel configuration.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

IEEE802.15.4 is an archetypal international standard for formation of a wireless sensor communication network, which defines the interface (i.e. "primitive") between PHY/MAC layer for low-power communications between sensors and the upper layer for application services. A basic performance level of IEEE802.15.4 ensures a data transmission rate at a maximum of 250 kbps if an Offset Quadrature Phase-Shift Keying (OQPSK) modulation scheme is applied, and does not include a basic channel coding mechanism for the sake of low-power consumption.

FIG. 1 is a diagram illustrating an example of IEEE802.15.4 channel configuration.

Referring to FIG. 1, according to the IEEE802.15.4, a total of 16 channels with widths of 5-MHz are operable at the 2.4 GHz band. Each channel may include a personal area network (PAN), and one PAN is a basic unit of a sensor network. When a coordinator selects one channel and regularly transmits a beacon through the selected channel, devices existing within a coverage area that detect the beacon create a PAN by joining the network.

Figure 2:
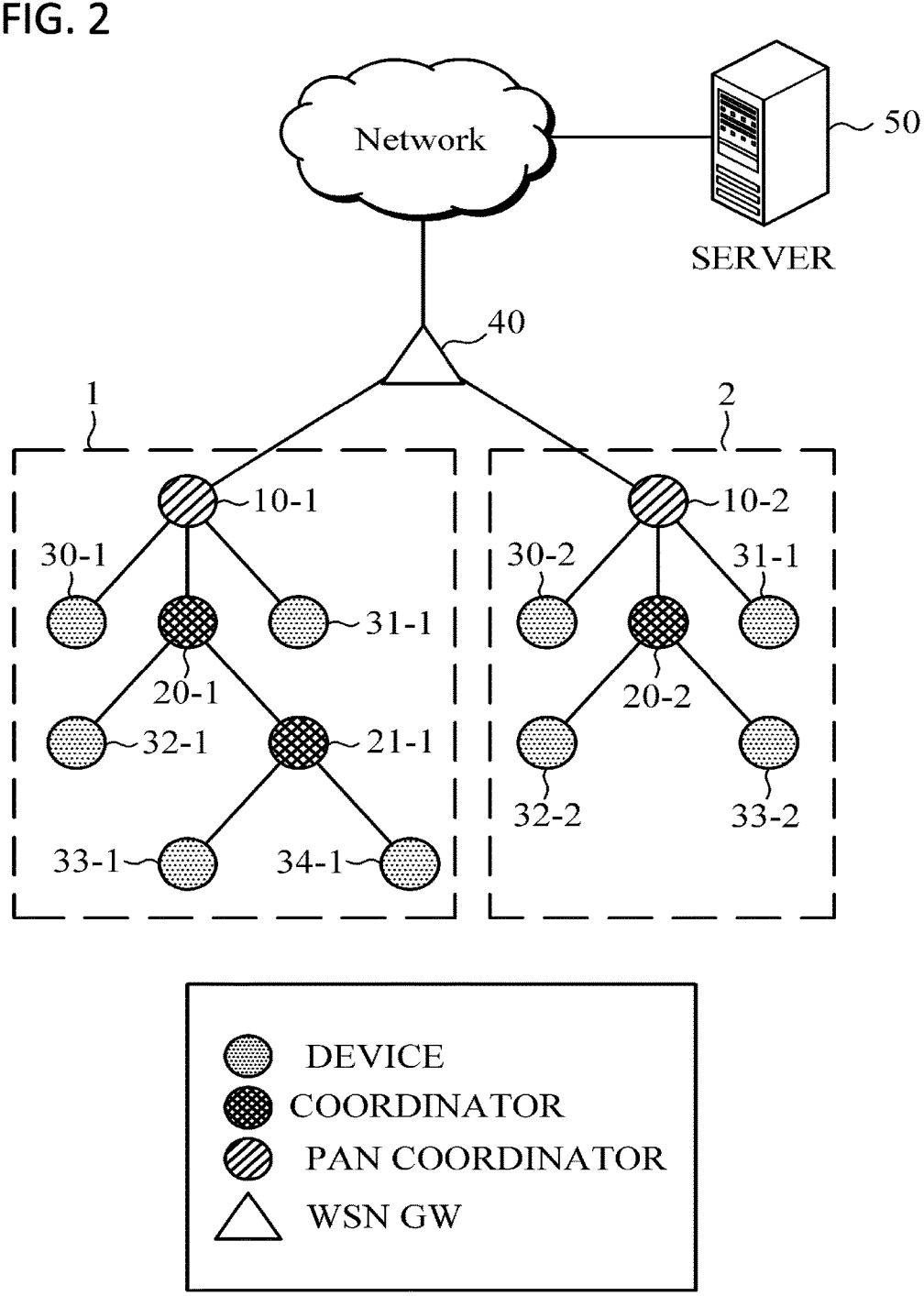
FIG. 2 is a diagram illustrating an example of a hierarchical sensor network.

FIG. 2 is a diagram illustrating an example of a hierarchical sensor network.

Referring to FIG. 2, devices in a wireless sensor network are connected to a server (50) via a gateway GW 40, wherein the server 50 is connected to a wired Internet backbone network. Personal area networks (PANs) 1 and 2 may be extended to have a peer-to-peer (P2P) cluster tree topology. In other words, there may be a number of PANs (i.e. PANs1 and 2) that have different channels within an overlapping coverage area.

The PANs 1 and 2 are managed by PAN coordinators 10-1 and 10-2 which are the highest level nodes connected to the gateway 40. The PAN coordinator 10-1 is linked to multiple sensors 30-1 and 30-2, or a relay coordinator 20-1. Similarly, the PAN coordinator 10-2 is linked to multiple sensors 31-1 and 31-2, or a relay coordinator 20-2. The relay coordinators 20-1 and 20-2 may be linked with one or more sensors 32-1, 32-2, 33-2 or another relay coordinator 21-1. Accordingly, one PAN is formed on one channel that is a radio resource shared among all sensors and coordinators within the same PAN and the PAN coordinator of said PAN.

Figure 3:
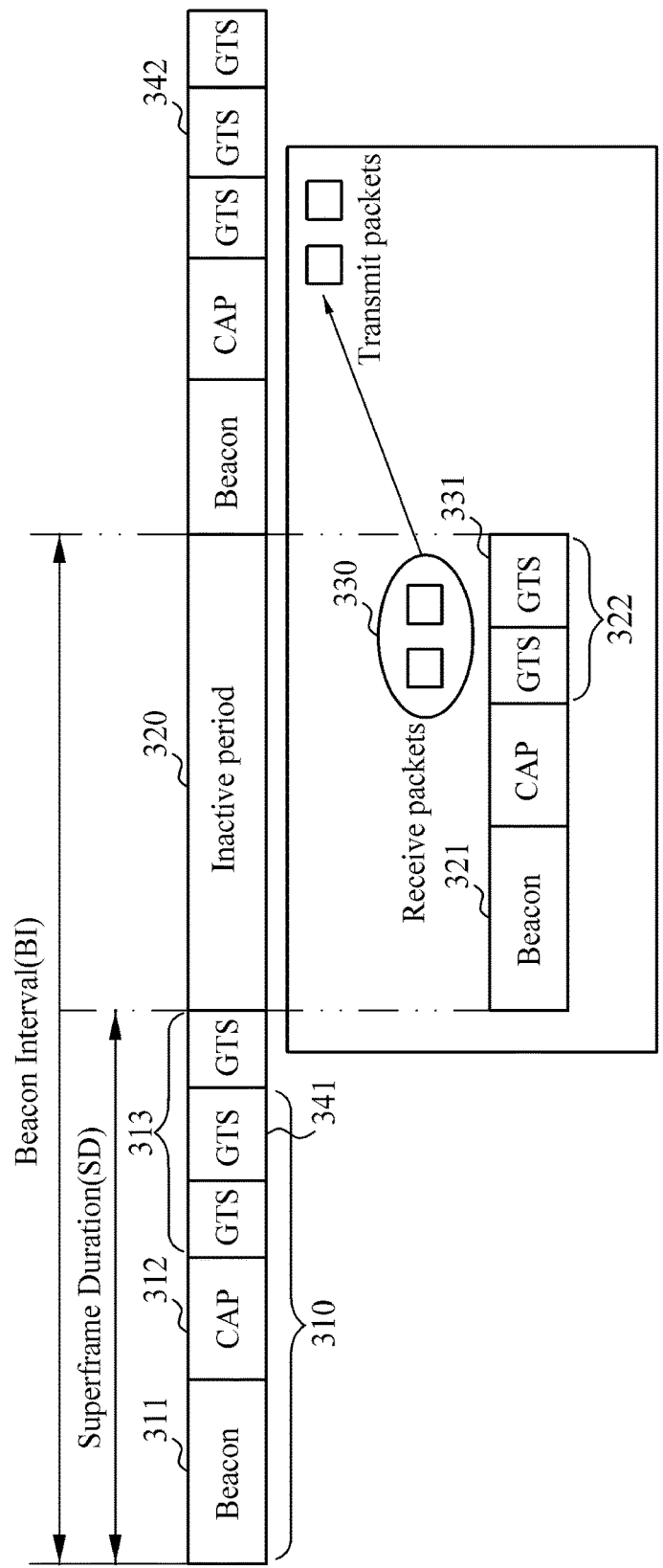
FIG. 3 is a diagram illustrating a frame structure according to an exemplary embodiment.

FIG. 3 is a diagram illustrating a frame structure according to an exemplary embodiment.

Referring to FIG. 3, a frame consists of an active period 310 and an inactive period 320. Nodes carry out transmission/reception operations in the active period 310, while said nodes enter a sleeping or standby phase with the minimum power consumption in the inactive period 320.

A beacon 311 is transmitted at a predefined time interval, and a beacon interval (BI) between beacons configures one wireless frame.

The active period 310 includes a contention access period (CAP) 312 and a contention free period (CFP) 313, which are operated independently. In the CAP 312, all devices connected to a coordinator can transmit and receive data at any time, and if multiple devices transmit data at the same time, a data collision may occur. On the contrary, in the CFP 313, each device is allocated dedicated time slots for data transmission/reception, and transmission collisions between devices can be avoided. According to IEEE802.15.4, the active period is limited to $(\frac{1}{2})^n$ (n=0, 1, 2, ...) of a beacon interval (i.e., a wireless frame). That is, the active period may take up the entirety of the wireless frame, or may be a duration that equals the value of 2 multiplied by the inverted power of n.

In the inactive period 320, where data transmission and reception are not allowed, all devices may disable their radio frequency (RF) functionality and operate in power-saving mode.

The present disclosure provides a technology for packet relay from a device to a PAN coordinator during an inactive period. A coordinator according to the present disclosure may serve as a relay device to cope with a transmission distance between the device and the PAN coordinator. The coordinator receives sensor data generated by the device and relays the received sensor data to the PAN coordinator. The coordinator may transmit a beacon to a PAN coordinator independently of said PAN coordinator, and thereby form a unique wireless frame thereof. At this time, a data transmission collision can only be avoided when an active period of each of the coordinators connected to the same PAN coordinator falls within an inactive period formed by said PAN coordinator.

Hence, during the inactive period 320 of the PAN coordinator, the coordinator transmits a beacon 321, while a device associated with the coordinator transmits guaranteed time slots (GTSs) 322 that are synchronized with the beacon 321. Currently, IEEE802.15.4 does not describe GTS operation in the coordinator. In the present disclosure, however, the coordinator receives a packet 330 from the associated device during the inactive period 320 of the PAN coordinator.

The coordinator has its own GTS period 341 and 342 within a superframe duration of the PAN coordinator, and transmits the received packet 330 to the PAN coordinator through its own GTS 342 of the next frame.

Figure 4:
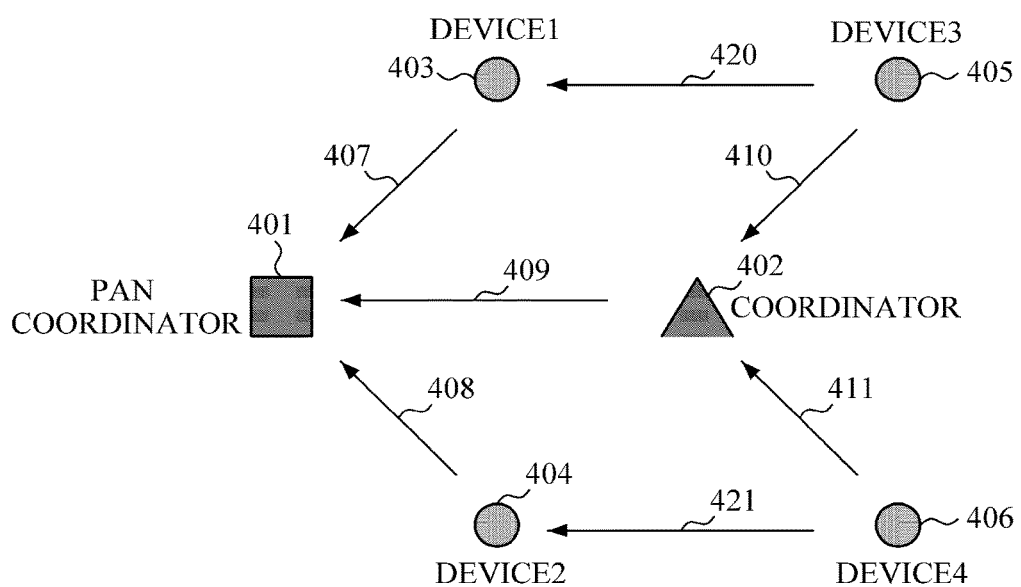
FIG. 4 is a diagram for explaining a dynamic packet relay in a hierarchical network.

FIG. 4 is a diagram for explaining a dynamic packet relay in a hierarchical network.

Referring to FIG. 4, when a coordinator 402 is defective or has a power failure, device 3 405 and device 4 406 become incapable of communication. This is because device 3 405 and device 4 406 transmit sensor data 409 to the communication links 410 and 411 which then travels to the coordinator 402, so that said data 409 may reach the PAN coordinator 401. In a case where a failure of communication due to malfunction of the coordinator 402 has occurred, utilizing other communication links 420 and 421 may be considered as an alternative solution (e.g. device 3 405 may use a link 420 and device 4 406 may use a link 421). In this case, device 1 403 and device 2 404 have to act as coordinators and transmit received sensor data to the PAN coordinator 401, as depicted by 407 and 408. However, device 1 403 and device 2 404 cannot transmit a beacon simultaneously, and thus such a method is not possible.

Figure 5:
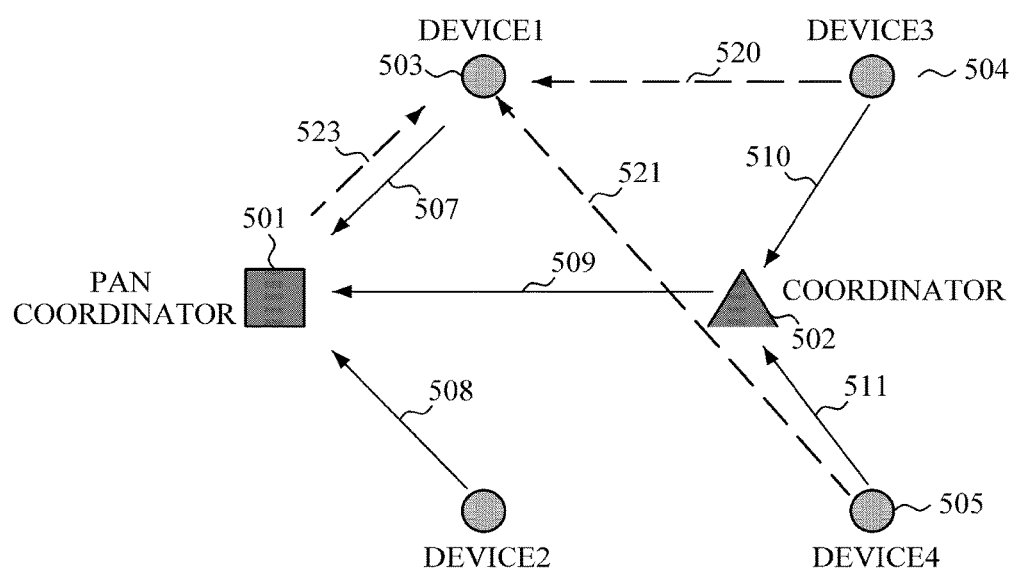
FIG. 5 is a diagram for explaining a dynamic packet relay in a hierarchical network according to an exemplary embodiment.

FIG. 5 is a diagram for explaining a dynamic packet relay in a hierarchical network according to an exemplary embodiment.

Referring to FIG. 5, device 1 503 serves as a coordinator for device 3 504 and device 4 505. Device 3 505 and device 4 506 transmit sensor data to device 1 503, as depicted by 520 and 521, rather than transmitting sensor data to a coordinator 502, and device 1 503 relays the received sensor data to a PAN coordinator 501. In this case, the PAN coordinator 501 transmits retained coordinator information to device 1 503, thereby allowing device 1 503 to change its mode to serve as a coordinator. Accordingly, device 1 503 gains the original frame structure of the coordinator 502 that is shown in FIG. 3. In this case, device 1 503 may be able to transmit its own sensor data in GTS thereof.

For easy understanding of a dynamic packet relay in a hierarchical network as shown in FIG. 5, examples of signal flow between devices in a situation where a coordinator changes will be described.

Figure 6:
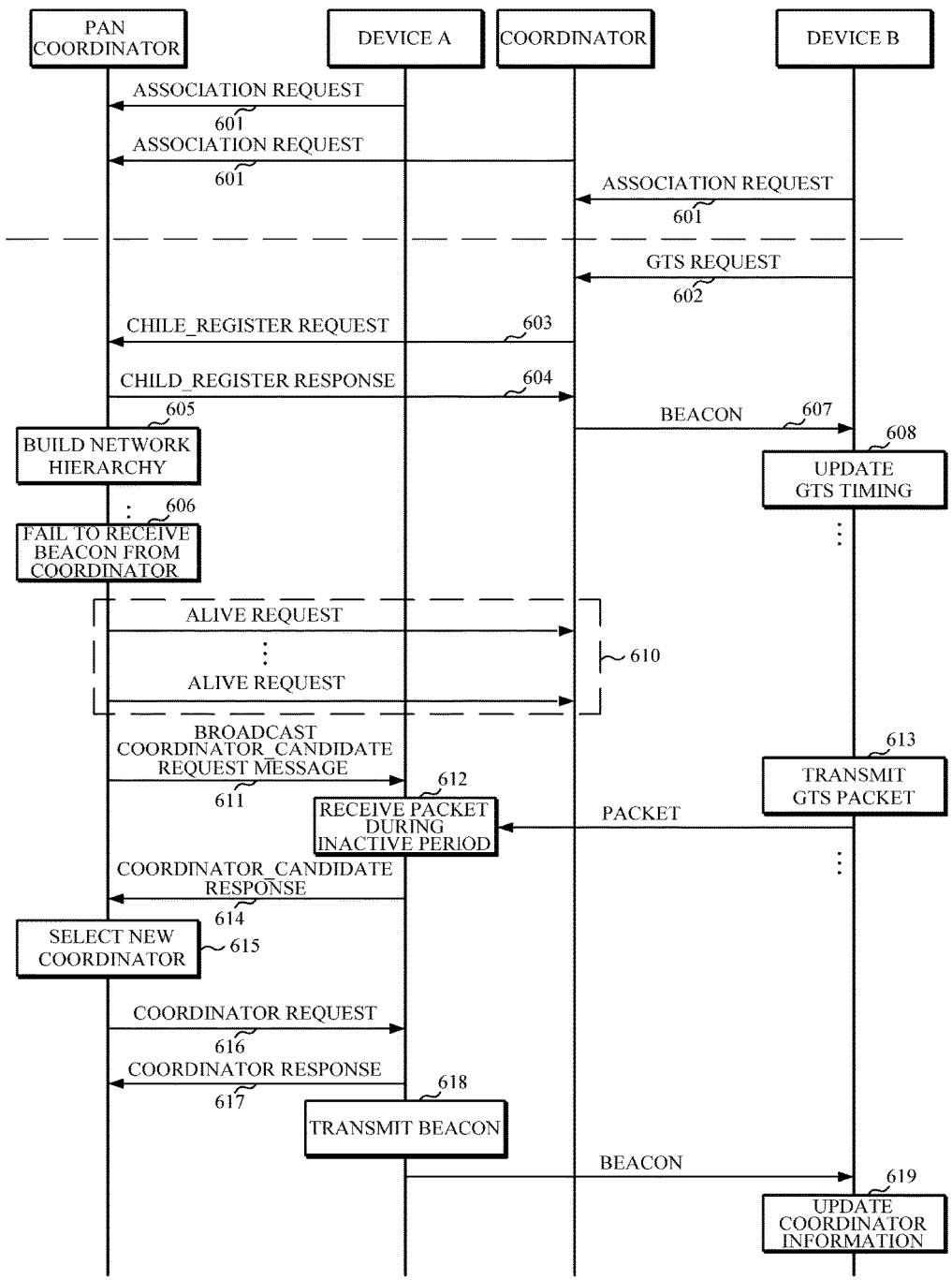
FIG. 6 is a diagram for explaining a dynamic packet relay in a sensor network according to an exemplary embodiment.

FIG. 6 is a diagram for explaining a dynamic packet relay in a sensor network according to an exemplary embodiment.

Referring to FIG. 6, device A is one that communicates with a PAN coordinator, and its role may later be changed so that it acts as a coordinator; device B is one that communicates with a coordinator, and it may later take on the role of new coordinator that communicates with device A.

Hence, as depicted in 601, device A sends an Association Request message for communication with the PAN coordinator, and device B sends an Association request message for communication with the coordinator.

The coordinator may also receive a GTS request message from device B, as depicted in 602, and then assigns a GTS to device B. This would mean the current condition of GTS assignment has changed, and as such, the coordinator sends a Child_Register Request message to the PAN coordinator, as depicted in 603.

Figure 7:
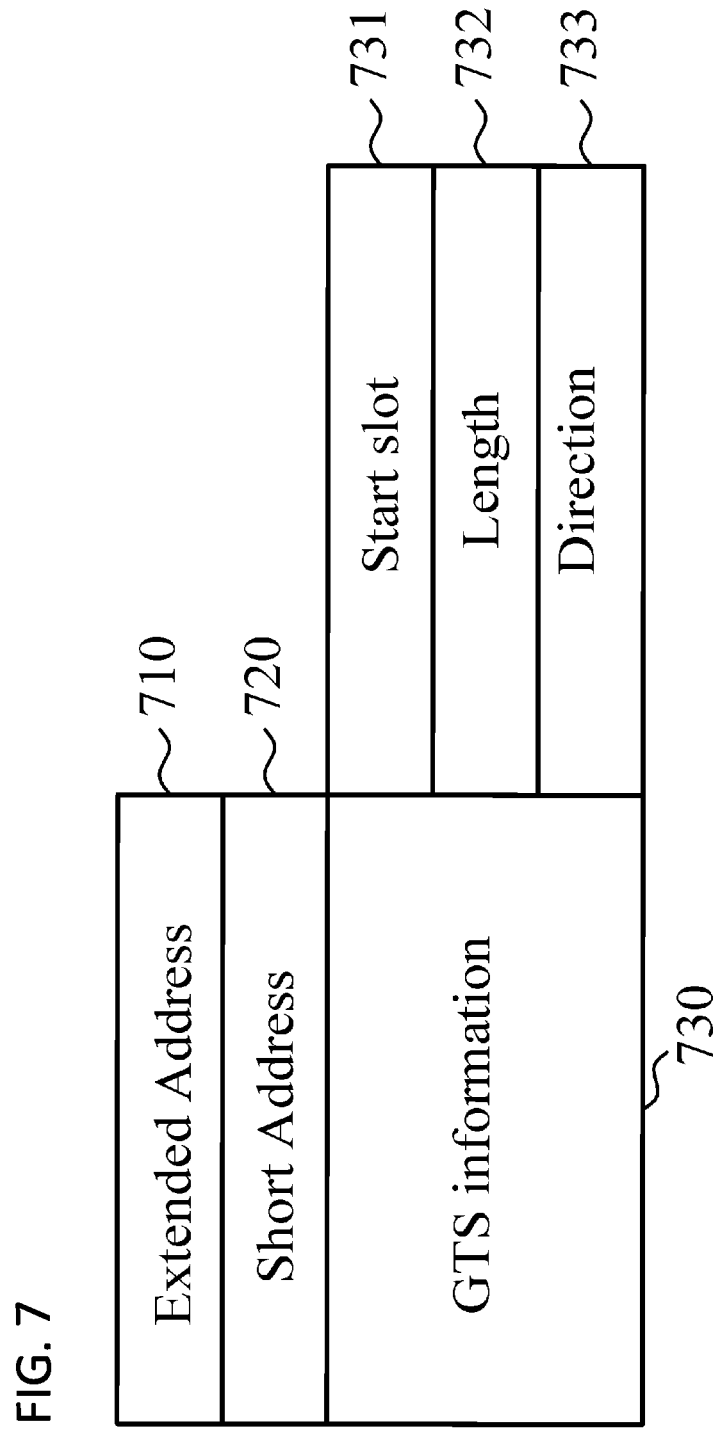
FIG. 7 is a diagram illustrating a structure of the Child_Register Request message according to an exemplary embodiment.

FIG. 7 is a diagram illustrating a structure of the Child_Register Request message according to an exemplary embodiment.

Referring to FIG. 7, the Child_Register Request message contains information about device B, including a media access control (MAC) extended address 710, a MAC short address 720, and GTS information 730. The GTS information 730 includes a start slot 731, a length 732, and a direction 733.

Referring back to FIG. 6, the PAN coordinator sends a Child_Register Response message as an acknowledgement to the Child_Register Request message, as depicted in 604.

The PAN coordinator then builds a network hierarchy based on information about device contained in the Child_Register Request message, as depicted in 605.

Figure 8:
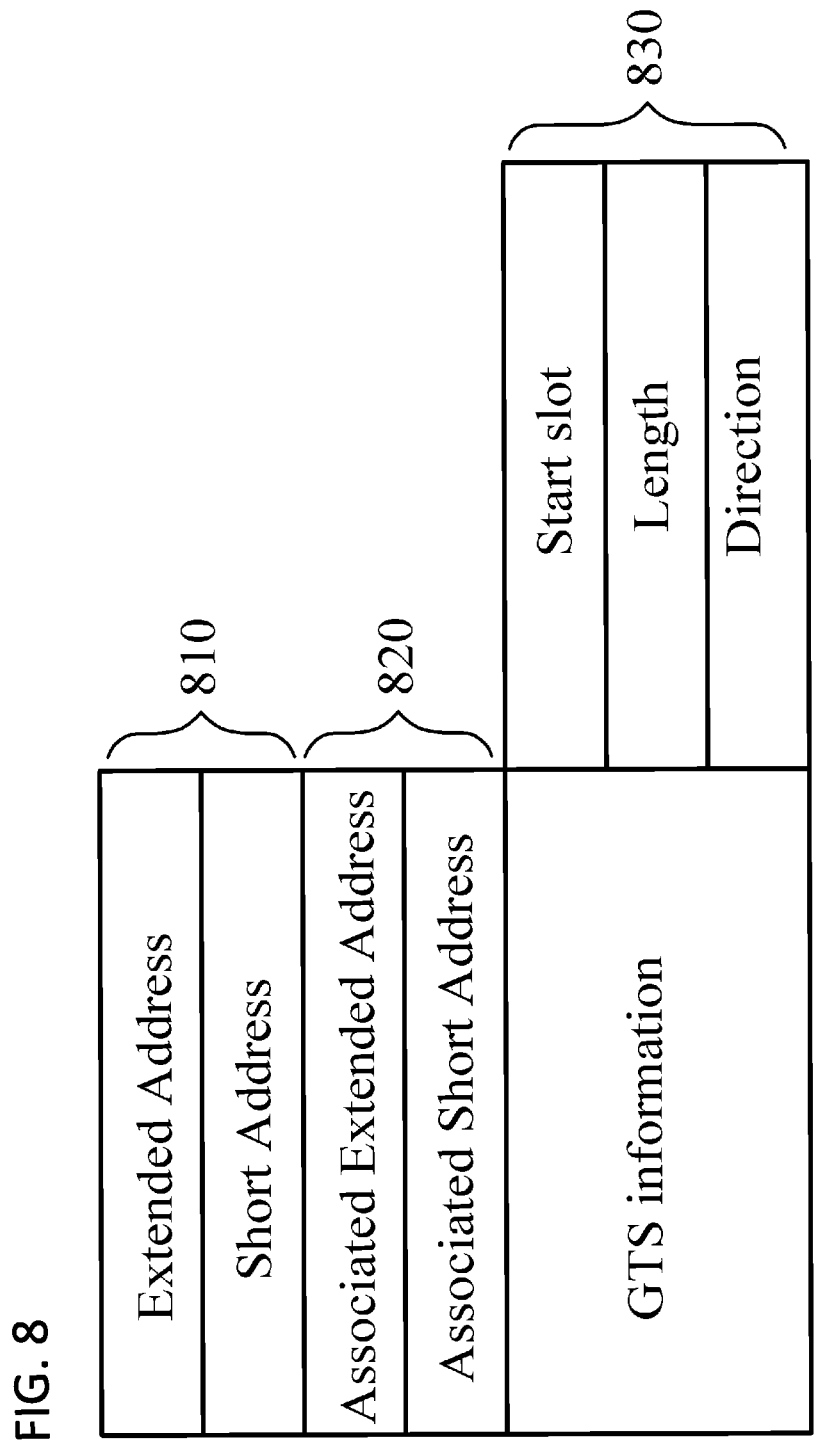
FIG. 8 is a diagram illustrating a structure of information contained in a network hierarchical structure according to an exemplary embodiment.

FIG. 8 is a diagram illustrating a structure of information contained in a network hierarchical structure according to an exemplary embodiment.

Referring to FIG. 8, the information contained in the network hierarchical structure includes a MAC extended address, a MAC short address 810, and GTS information 830 which are all device information; information about a device and its associated coordinator—the associated MAC extended address and associated MAC short address 820—are also included in said structure.

When no data has been received from device B for a specific amount of time or no beacon is received from the coordinator, the PAN coordinator detects a fault in the coordinator, as depicted in 606. Then, the PAN coordinator sends an Alive Request message to the coordinator and waits for a response, as depicted in 610. If no response is received from the coordinator even after a designated number of retransmissions, as depicted in 610, the PAN coordinator determines that the coordinator is defective and subsequently broadcasts a Coordinator_Candidate Request message, which contains the information shown in FIG. 8, in order to change the current coordinator to another coordinator, as depicted in 611.

Device A receives then a packet during the inactive period, as depicted in 612, and stores information about a packet whose destination address is either an associated extended address or an associated short address, which is shown in FIG. 8, and whose source address is either an extended address or a short address, which is also shown in FIG. 8. That is, device A stores the packet's information that has been transmitted from device B to the coordinator.

Thereafter, device A sends a Coordinator_Candidate Response message to the PAN coordinator, as depicted in 614.

Figure 9:
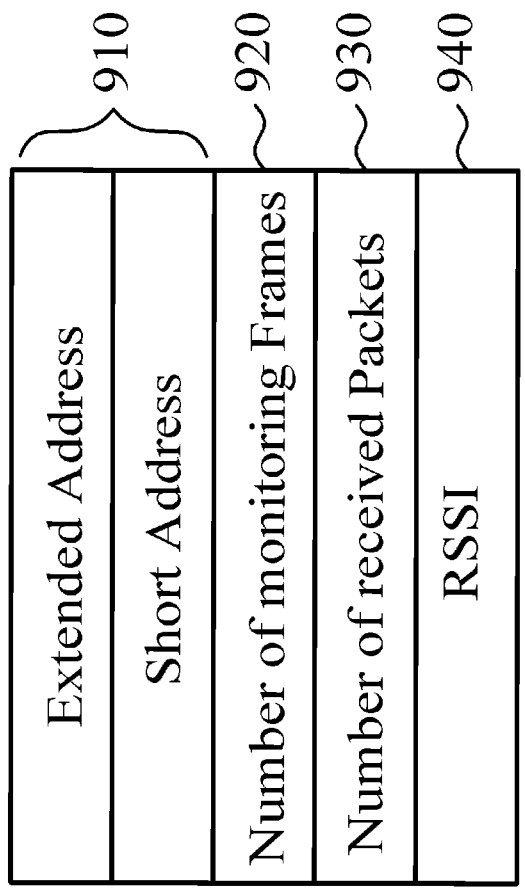
FIG. 9 is a diagram illustrating a structure of packet information contained in the Coordinator_Candidate Response message according to an exemplary embodiment.

FIG. 9 is a diagram illustrating a structure of packet information contained in the Coordinator_Candidate Response message according to an exemplary embodiment.

Referring to FIG. 9, the Coordinator_Candidate Response message includes an extended address and a short address which are source addresses 910, the number of monitoring frames 920, the number of received packets 930, and a received signal strength indication (RSSI) 940.

Referring back to FIG. 6, the PAN coordinator selects a coordinator candidate based on the Coordinator_Candidate Response message sent from device A, as depicted in 615, and sends a Coordinator Request message to selected device A, as depicted in 616. The Coordinator Request message may include the information as shown in FIG. 8.

Device A sends an acknowledgement to the Coordinator Request message, as depicted in 617, changes its mode to serve as a coordinator, and transmits its own beacon 618.

Meanwhile, device B updates its own GTS timing each time it receives a beacon from the coordinator, as depicted in 608. Even when not receiving a beacon, device B transmits a packet based on its GTS timing, as depicted in 613. In the case where device B does not receive a beacon from an associated coordinator, but receives a beacon from another coordinator with a different address during a time slot dedicated for receiving a beacon, device B detects that the associated coordinator is defective, and updates coordinator information based on currently received beacon information, as depicted in 619. Therefore, device B can initiate communications with the changed coordinator without additional protocols.

FIG. 10A is a flowchart illustrating a dynamic packet relay method performed by a PAN coordinator in a sensor network according to an exemplary embodiment.

Referring to FIG. 10A, a PAN coordinator receives a Child_Register message that contains information about a device (hereinafter, referred to as "device B") associated with a coordinator, and builds or updates a network hierarchical structure, as depicted in S1010.

Here, as shown in FIG. 7, the device information includes a MAC extended address, a MAC short address, and GTS information. Also, as shown in FIG. 8, the network hierarchical structure includes a MAC extended address, a MAC short address 810, and GTS information 830 which are all device information; information about a device and its associated coordinator—the associated MAC extended address and associated MAC short address 820—are also included in said structure.

The PAN coordinator monitors data reception from the coordinator and determines whether the coordinator is defective or not, as depicted in S1020. This operation will be described in detail with reference to FIG. 10B.

If it is determined in S1020 that the coordinator is defective, the PAN coordinator changes one of devices (hereinafter, referred to as "device A") associated therewith as a new coordinator, as depicted in S1030. This operation will be described in detail with reference to FIG. 10C.

FIG. 10B is a flowchart illustrating in detail the operation of FIG. 10 for determining whether a coordinator is defective or not.

Referring to FIG. 10B, the PAN coordinator monitors the reception of data or a beacon from the coordinator for a predetermined time period, as depicted in S1021.

If no data or beacon has been received from the coordinator for the predetermined time period, the PAN coordinator sends an Alive Request message to said coordinator, as depicted in S1022. Thereafter, the PAN coordinator monitors the reception of an acknowledgement message sent in response to the Alive Request message, as depicted in S1023. If the PAN coordinator receives an acknowledgement to the Alive Request message within a predetermined time period, the PAN coordinator determines that the coordinator is working normally, as depicted in S1026.

If the PAN coordinator fails to receive an acknowledgement regarding the Alive Request message within the predetermined time period, the PAN coordinator resends the Alive Request message and considers whether the number of transmissions of said message has exceeded a designated threshold, as depicted in S1024.

If it is determined in S1024 that the number of transmissions have not exceeded the threshold, the PAN coordinator proceeds to operation S1022 and resends the Alive Request message. On the contrary, if it is determined that the number of transmissions has exceeded the threshold, the PAN coordinator determines that the coordinator is defective, as depicted in S1025.

Figure 10C:
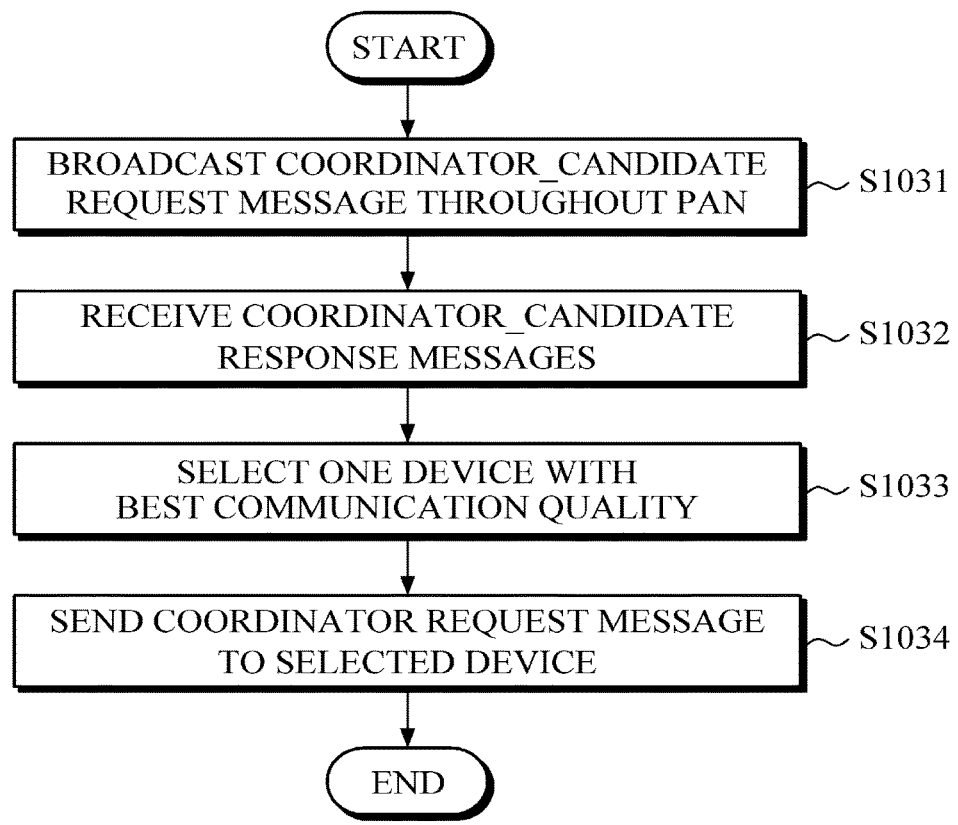
FIG. 10C is a flowchart illustrating the operation of FIG. 10A for changing a coordinator.

FIG. 10C is a flowchart illustrating the operation of FIG. 10A for changing a coordinator.

Referring to FIG. 10C, the PAN coordinator broadcasts a Coordinator_Candidate Request message throughout the PAN, as depicted in S1031. The Coordinator_Candidate Request message includes coordinator information and information about a device associated with the coordinator.

The PAN coordinator receives Coordinator_Candidate Response messages from all devices belonging to the PAN, as depicted in S1032. The Coordinator_Candidate Response message is structured as shown in FIG. 9.

The PAN coordinator selects a device with the best communication quality by analyzing the received Coordinator_Candidate Response messages, as depicted in S1033. In other words, the PAN coordinator selects the device that sent a Coordinator_Candidate Response message with the most packets per frame and the highest RSSI value.

The PAN coordinator sends a Coordinator Request message to the selected device, as depicted in S1034. Here, the Coordinator Request message includes coordinator information and information about the device associated with the coordinator.

Figure 11A:
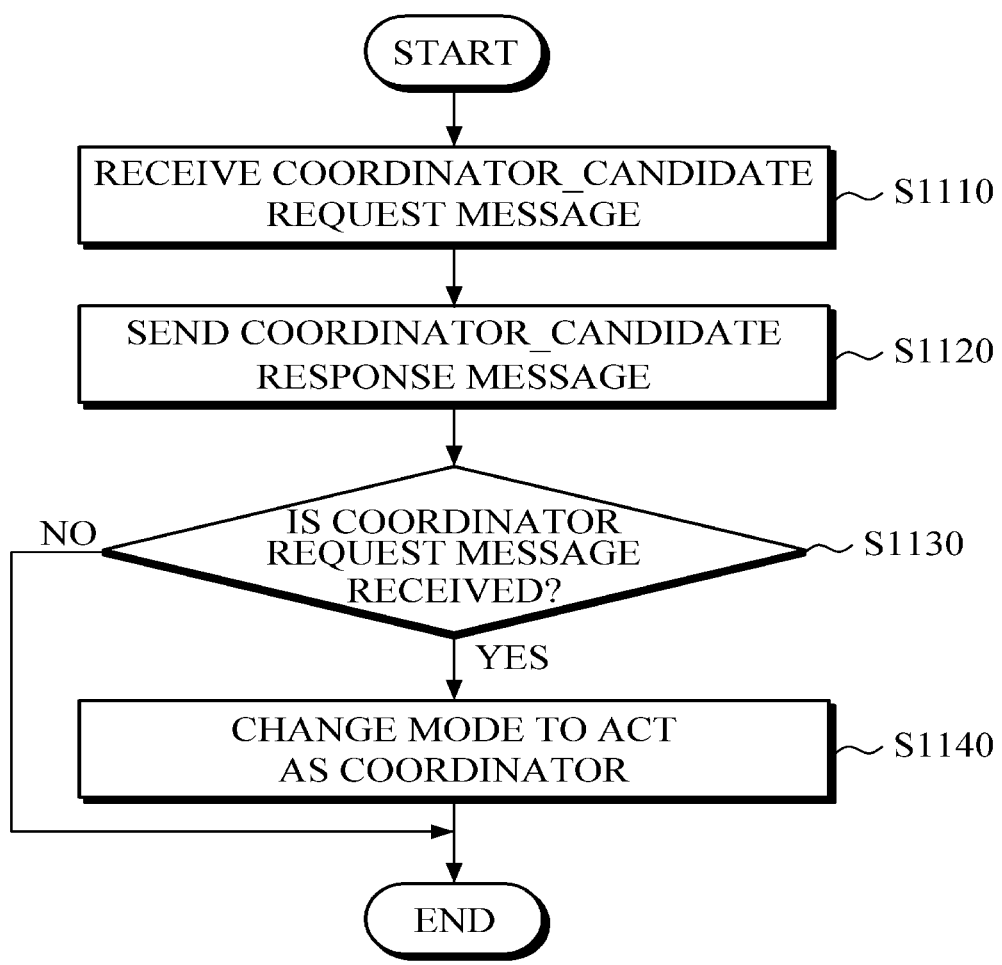
FIG. 11A is a flowchart illustrating a dynamic packet relay method performed by a device associated with a PAN coordinator in a sensor network according to an exemplary embodiment.

FIG. 11A is a flowchart illustrating a dynamic packet relay method performed by a device associated with a PAN coordinator in a sensor network according to an exemplary embodiment.

Referring to FIG. 11A, device A receives a Coordinator_Candidate Request message from the PAN coordinator, as depicted in S1110, wherein the Coordinator_Candidate Request message includes coordinator information and information about a device associated with the coordinator.

Device A sends a Coordinator_Candidate Response message to the PAN coordinator, as depicted in S1120, wherein the Coordinator_Candidate Response message contains information regarding a packet which has been received during an inactive period, the packet being transmitted to the coordinator from a device (hereinafter, referred to as "device B") associated with the coordinator. This operation will be described in detail with reference to FIG. 11B.

When device A receives a Coordinator Request message from the PAN coordinator, as depicted in S1130, device A changes its mode to act as a coordinator from the following frame, as depicted in S1140.

Figure 11B:
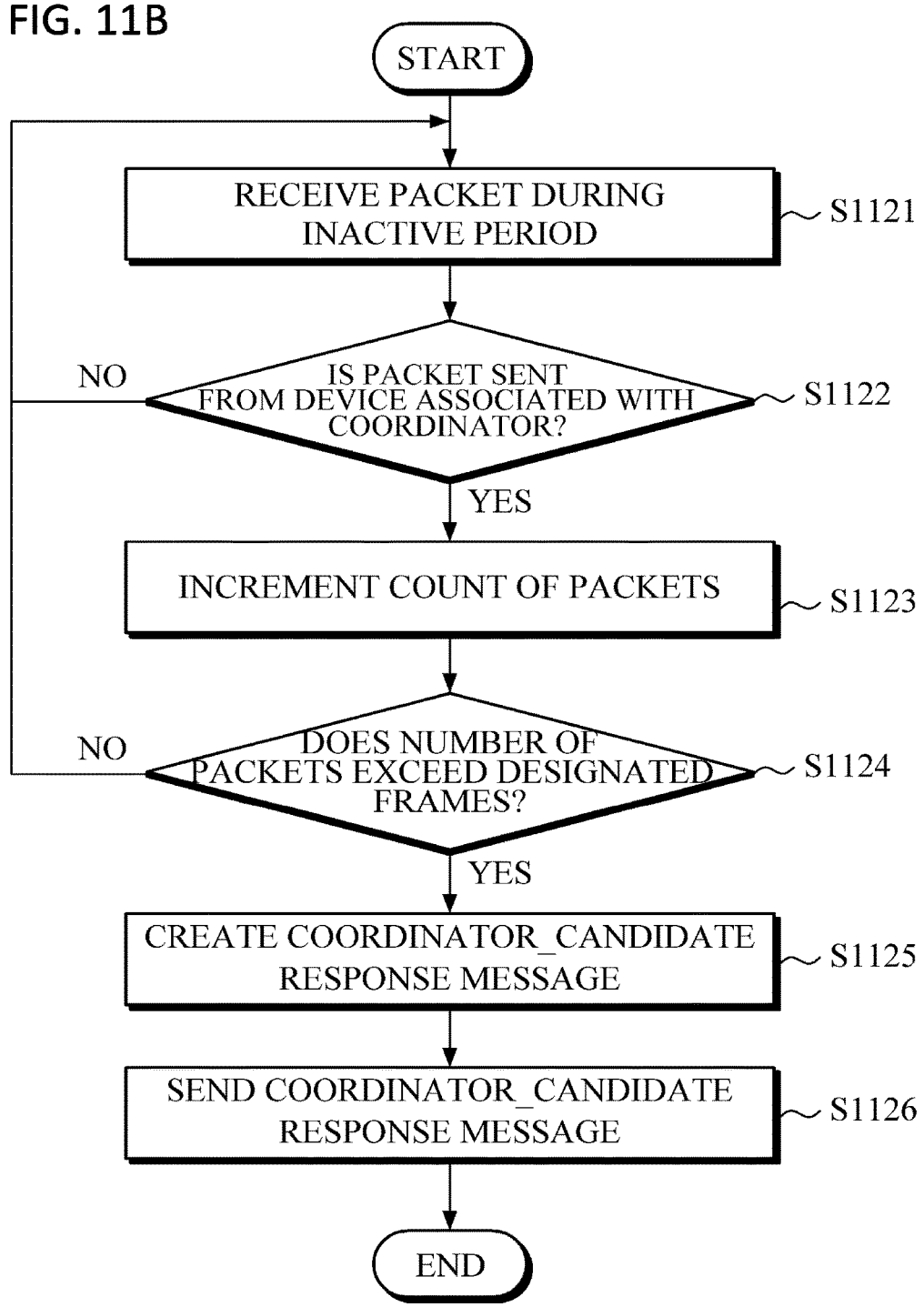
FIG. 11B is a flowchart illustrating the operation of FIG. 11A for sending the Coordinator_Candidate Response message.

FIG. 11B is a flowchart illustrating the operation of FIG. 11A for sending the Coordinator_Candidate Response message.

Referring to FIG. 11B, when device A receives a packet during an inactive period, as depicted in S1121, device A determines whether the packet has been sent from device B, as depicted in S1122. Specifically, device A compares a source address in a MAC header of the packet with device B's address contained in the Coordinator_Candidate Request message, as well as comparing a destination address in a MAC header of said packet with a coordinator's address contained in said Request message.

If it is determined in S1122 that the received packet was sent from device B, the number of packets device A has received is increased by one.

Then, device A determines whether the number of received packets exceeds a designated number of frames, as depicted in S1124. If the number of packets does not exceed said number of frames, device A proceeds to operation S1121 to receive another packet.

If the number of packets indeed exceeds said number of frames, device A creates a Coordinator_Candidate Response message using calculated values, as depicted in 51125. Then, device A sends the created Coordinator_Candidate Response message to the PAN coordinator, as depicted in S1126.

FIG. 12 is a flowchart illustrating a dynamic packet relay method performed by a coordinator in a sensor network according to an exemplary embodiment.

Referring to FIG. 12, in response to a GTS allocation request from device B, as depicted in S1210, a coordinator sends a Child_Register message, which contains information regarding device B, to a PAN coordinator, as depicted in S1220. In this case, the coordinator may send a Child_Register message to the PAN coordinator each time any information regarding device B is changed.

The coordinator that has transmitted a beacon to device B receives, in turn, a packet from device B during an inactive period of the PAN coordinator, as depicted in S1230.

Then, the coordinator transmits the received packet to the PAN coordinator during an active period of the PAN coordinator, as depicted in S1240. That is, the coordinator relays the packet that has been received during the inactive period of the PAN coordinator to the PAN coordinator during a GTS period allocated thereto.

Figure 13:
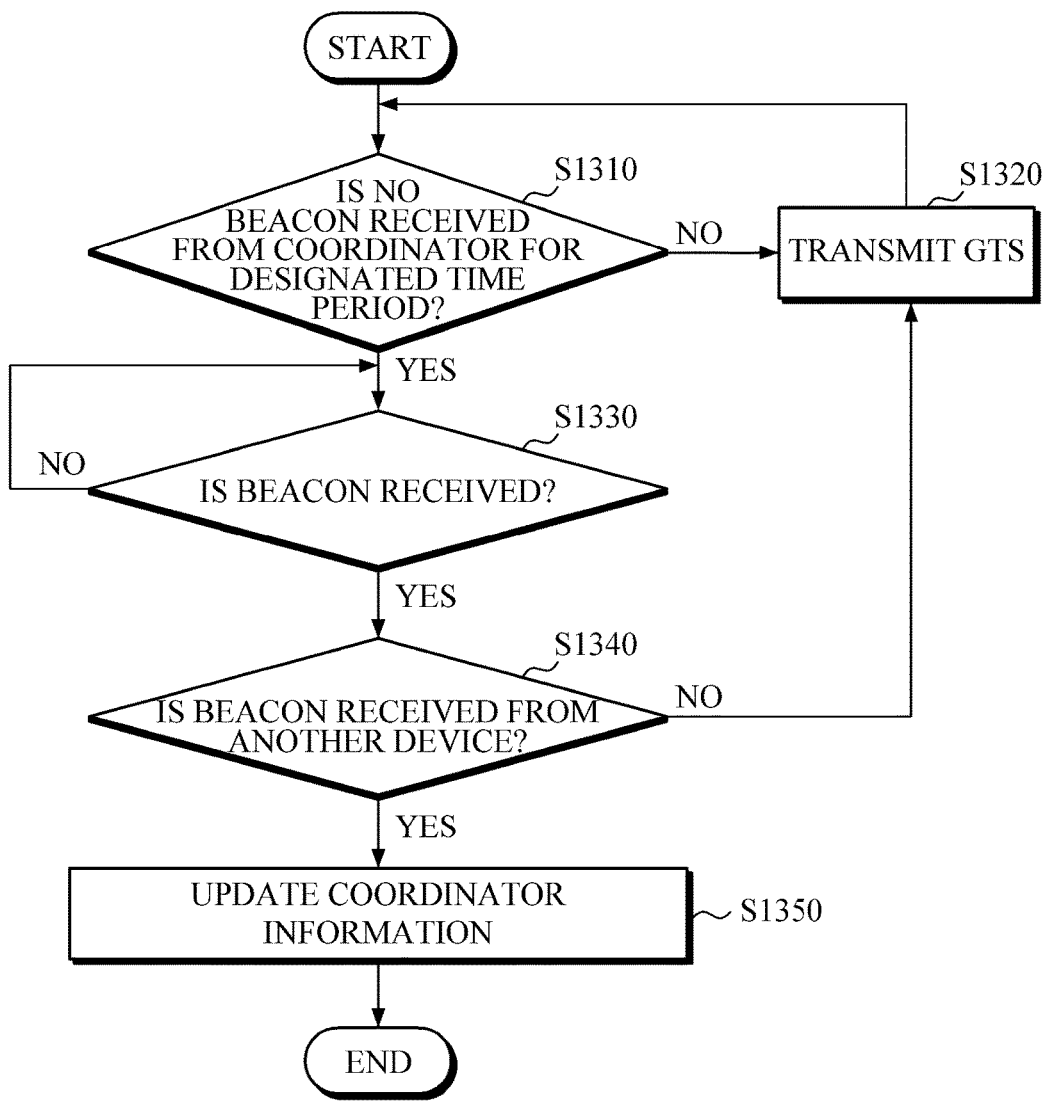
FIG. 13 is a flowchart illustrating a dynamic packet relay method performed by a device associated with a coordinator in a sensor network according to an exemplary embodiment.

FIG. 13 is a flowchart illustrating a dynamic packet relay method performed by a device associated with a coordinator in a sensor network according to an exemplary embodiment.

Referring to FIG. 13, device B determines whether a beacon is received from an associated coordinator within a designated period of time, as depicted in S1310. If when it is determined that the beacon is received from the associated coordinator, device B updates its own GTS timing. When device B fails to receive a beacon from the associated coordinator, device B stands by for a specific time period to receive a beacon, as depicted in S1330.

When receiving a beacon, device B determines whether the received beacon was sent from the associated coordinator or another device, as depicted in S1340. If the beacon was sent from another device, device B updates coordinator information based on said device's information, as depicted in S1350.

Figure 14:
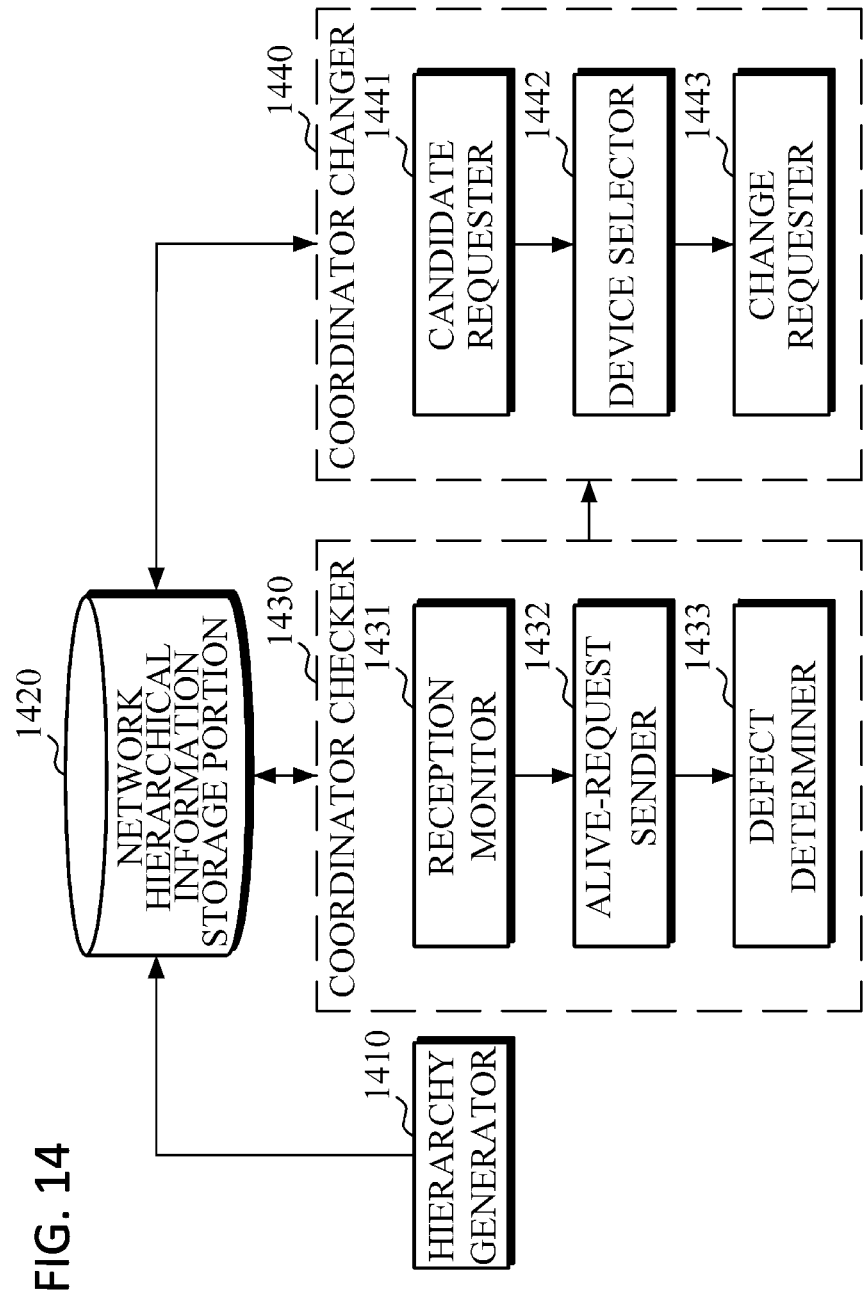
FIG. 14 is a block diagram illustrating a dynamic packet relay apparatus applied to a PAN coordinator according to an exemplary embodiment.

FIG. 14 is a block diagram illustrating a dynamic packet relay apparatus applied to a PAN coordinator according to an exemplary embodiment.

Referring to FIG. 14, the dynamic packet relay apparatus applied to the PAN coordinator includes a relay hierarchy generator 1410, a network hierarchical information storage portion 1420, a coordinator checker 1430, and a coordinator changer 1440.

The relay hierarchy generator 1410 receives a Child_Register message that includes information about a device associated with a coordinator, and then builds or updates a network hierarchical structure. The network hierarchical information storage portion 1420 stores pieces of network hierarchical information as shown in FIG. 8.

The coordinator checker 1430 monitors the reception from the coordinator, and detects a fault of the coordinator. The coordinator checker 1430 includes a reception monitor 1431, an alive-request sender 1432, and a defect determiner 1433.

The reception monitor 1431 monitors the reception of data or beacon from the coordinator for a predetermined time period, whereby if none is received in due time, the alive-request sender 1432 sends an Alive Request message to the coordinator. If no response is received regarding the Alive Request message, the defect determiner 1433 determines that the coordinator is defective.

In response to a report sent from the coordinator checker 1430 that the coordinator is defective, the coordinator changer 1440 changes to a new coordinator by swapping out the current coordinator to one of the devices belonging to the PAN. The coordinator changer 1440 includes a candidate requester 1441, a device selector 1442, and a change requester 1443.

The candidate requester 1441 broadcasts a Coordinator_Candidate Request message throughout the PAN. The device selector 1442 receives Coordinator_Candidate Response messages from the devices in the PAN, and selects one device that has the best communication quality, based on the analysis of the received Coordinator_Candidate Response messages. The change requester 1443 sends a Coordinator Request message to the selected device.

Both the Coordinator_Candidate Request message and the Coordinator Request message contain coordinator information and information about the device that is associated with the coordinator.

Figure 15:
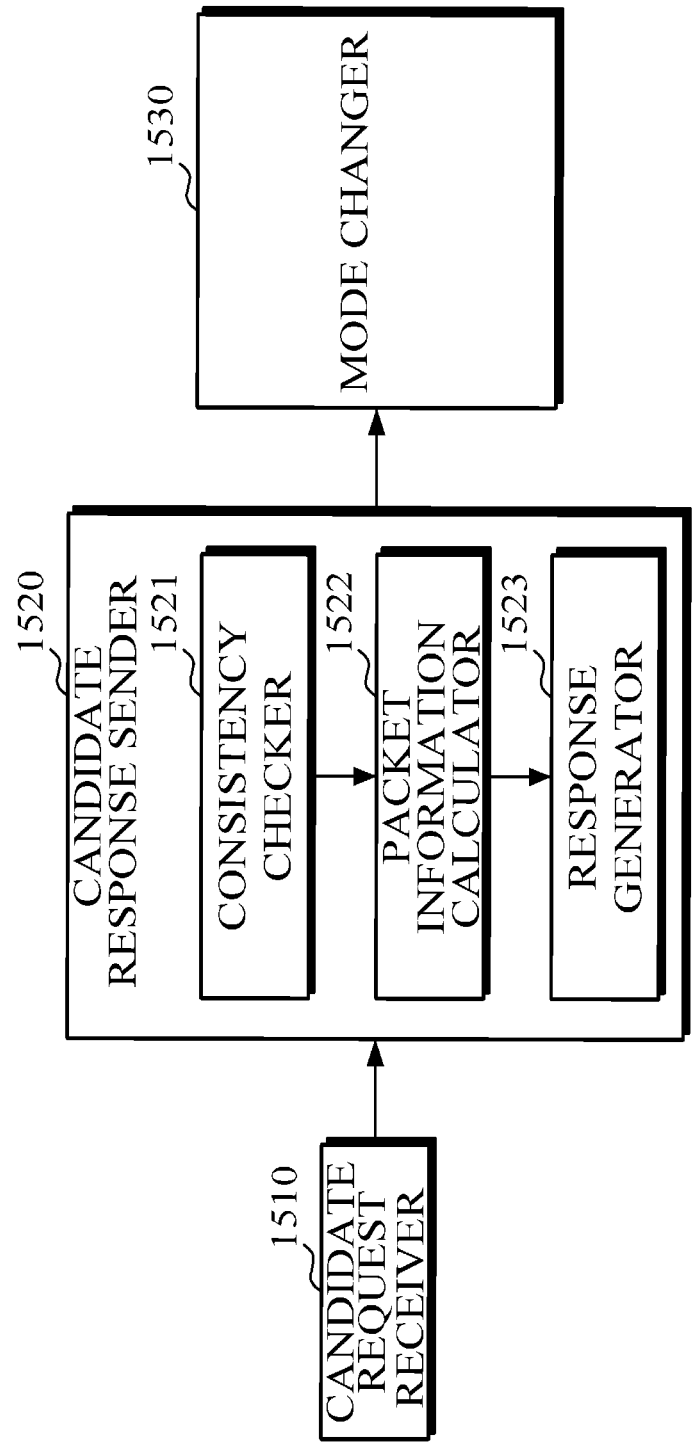
FIG. 15 is a block diagram illustrating a dynamic packet relay apparatus applied to a device associated with a PAN coordinator according to an exemplary embodiment.

FIG. 15 is a block diagram illustrating a dynamic packet relay apparatus applied to a device associated with a PAN coordinator according to an exemplary embodiment.

Referring to FIG. 15, device A includes a candidate request receiver 1S10, a candidate response sender 1520, and a mode changer 1530.

The candidate request receiver 1S10 receives, from a PAN coordinator, a Coordinator_Candidate Request message that contains coordinator information and information about the device associated with the coordinator.

The candidate response sender 1520 sends a Coordinator_Candidate Response message to the PAN coordinator, wherein the Coordinator_Candidate Response message contains information regarding a packet which has been received during an inactive period, the packet being transmitted to the coordinator from the device associated with the coordinator. In detail, the candidate response sender 1520 includes a consistency checker 1521, a packet information calculator 1522, and a response generator 1523.

The consistency checker 1521 compares a source address in a MAC header of the packet, which was received during the inactive period, with an address of the device associated with the coordinator, and then compares a destination address with a coordinator's address. The packet information calculator 1522 performs comparisons during a designated frame period and calculates both the number of packets with matching addresses, as well as the RSSI value. The response generator 1523 creates a Coordinator_Candidate Response message using the calculated values.

In response to receiving a Coordinator Request message from the PAN coordinator, the mode changer 1530 changes the mode of the device to serve as a coordinator from the following frame.

Figure 16:
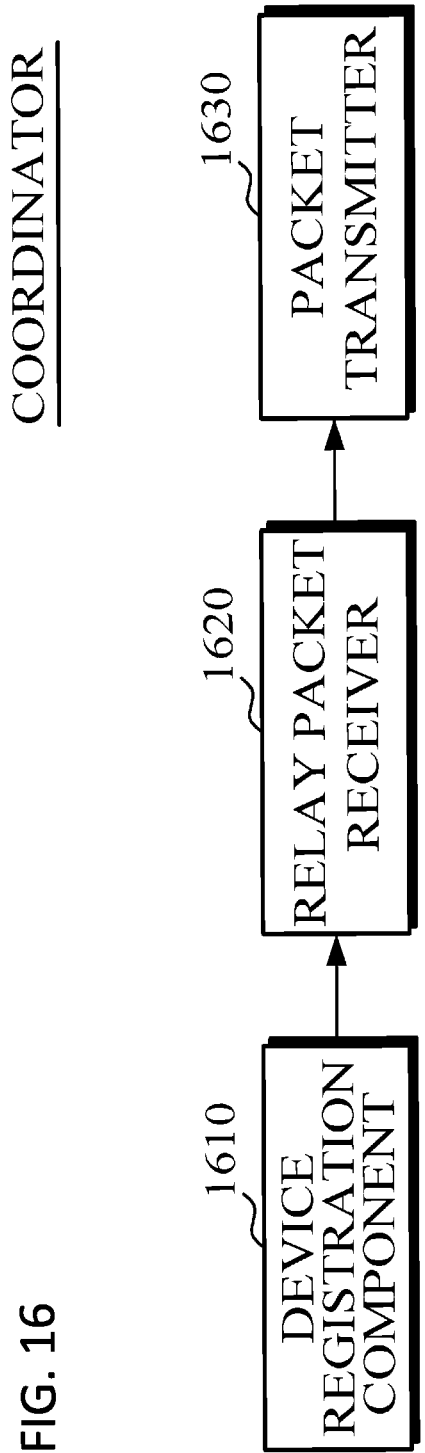
FIG. 16 is a block diagram illustrating a dynamic packet relay apparatus applied to a coordinator according to an exemplary embodiment.

FIG. 16 is a block diagram illustrating a dynamic packet relay apparatus applied to a coordinator according to an exemplary embodiment.

Referring to FIG. 16, a coordinator includes a device registration component 1610, a relay packet receiver 1620, and a packet transmitter 1630.

The device registration component 1610 sends a Child_Register message to a PAN coordinator, wherein the Child_Register message contains information about a device associated with the coordinator. Also, the device registration component 1610 sends the Child_Register message to the PAN coordinator each time information about the associated device is changed.

The relay packet receiver 1620 transmits a beacon to the associated device and receives, in turn, a packet from the device during an inactive period of the PAN coordinator.

The packet transmitter 1630 transmits the packet to the PAN coordinator during an active period of the PAN coordinator.

Figure 17:
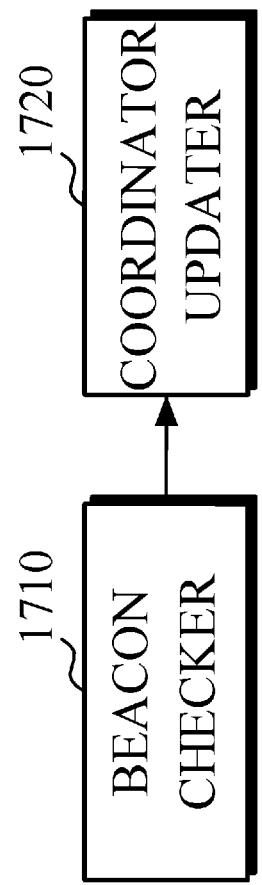
FIG. 17 is a diagram illustrating a dynamic packet relay apparatus applied to a device (namely, "device B") associated with a coordinator according to an exemplary embodiment.

FIG. 17 is a diagram illustrating a dynamic packet relay apparatus applied to a device (namely, "device B") associated with a coordinator according to an exemplary embodiment.

Referring to FIG. 17, device B includes a beacon checker 1710 and a coordinator updater 1720.

If device B fails to receive a beacon from an associated coordinator, the beacon checker 1710 stands by for a specific time period to receive a beacon. When a beacon is received, the beacon checker 1710 determines whether the beacon has been sent from the associated coordinator or another device.

If the beacon was sent from another device, the coordinator updater 1720 updates coordinator information based on the device's information.

As described above, the present disclosure provides a relay method that can increase flexibility in radio resource allocation in a sensor network as well as cope with a short radio coverage caused by low-power-based operation and a limited transmission distance of the sensor network. According to the above exemplary embodiments, it is possible to build a reliable sensor network for transmitting sensor data to the final destination.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A dynamic packet relay method of a personal area network (PAN) coordinator and a device associated with the PAN coordinator in a sensor network, the dynamic packet relay method comprising:
   receiving, at the PAN coordinator, a Child_Register message that includes information about a device associated with a coordinator and building or updating a network hierarchical structure;
   monitoring, at the PAN coordinator, reception of a packet or a beacon from the coordinator and determining whether the coordinator is defective or not;
   in response to a determination that the coordinator is defective, changing, at the PAN coordinator, a current coordinator to one of devices belonging to a PAN as a new coordinator
   wherein during an inactive period of the RAN coordinator, the device associated with the coordinator transmits a packet to the coordinator and receives a beacon from the coordinator, and
   wherein, when the coordinator is defective, one of the devices belonging to the PAN that received the packet transmitted during the inactive period of the PAN coordinator is determined as the new coordinator.

2. The dynamic packet relay method of claim 1, wherein the information about a device includes a media access control (MAC) extended address, a MAC short address, and guaranteed time slot (GTS) information.

3. The dynamic packet relay method of claim 1, wherein the network hierarchical structure includes the MAC extended address, the MAC short address and the GTS information, which are device information, and an associated MAC extended address and an associated MAC short address which are information about the coordinator associated with the device.

4. The dynamic packet relay method of claim 1, wherein the determining of whether the coordinator is defective or not comprises:
monitoring the reception of a packet or a beacon from the coordinator for a predetermined time period,
in response to no beacon or data being received for the predetermined time period, sending an Alive Request message to the coordinator, and
in response to no response to the Alive Request message being received from the coordinator, determining that the coordinator is defective.

5. The dynamic packet relay method of claim 1, wherein the changing of the current coordinator comprises:
broadcasting a Coordinator_Candidate Request message throughout the PAN,
receiving a Coordinator_Candidate Response message from all devices belonging to the PAN,
selecting one device with the best communication quality by analyzing the received Coordinator_Candidate Response messages, and
sending a Coordinator Request message to the selected device.

6. The dynamic packet relay method of claim 5, wherein both the Coordinator_Candidate Request message and the Coordinator Request message contain information about the coordinator and the information about the device associated with the coordinator.

7. The dynamic packet relay method of claim 5, further comprising:
receiving, at the device associated with the PAN coordinator, a Coordinator_Candidate Request message from a PAN coordinator, the Coordinator_Candidate Request message containing coordinator information and information about a device associated with a coordinator;
sending, from the device associated with the PAN coordinator, a Coordinator_Candidate Response message to the PAN coordinator, wherein the Coordinator_Candidate Response message contains information regarding a packet which has been received during an inactive period, the packet being transmitted to the coordinator from the device associated with the coordinator; and
in response to receiving a Coordinator Request message from the PAN coordinator, changing, at the device associated with the PAN coordinator, a mode to serve as a coordinator from a following frame.

8. The dynamic packet relay method of claim 7, wherein the sending of the Coordinator_Candidate Response message comprises:
comparing a source address in a MAC header of the packet received during the inactive period, with an address of the device associated with the coordinator, and comparing a destination address with an address of the coordinator,
calculating both a number of packets with source and destination addresses that match the addresses of the device and the associated coordinator and a value of received signal strength indication (RSSI) during designated frame periods, and
creating the Coordinator_Candidate Response message using the calculated values.

9. A dynamic packet relay apparatus of a (personal area network) PAN coordinator comprising:
a relay hierarchy generator configured to receive a Child_Register message that contains information about a device associated with a coordinator, and build or update a network hierarchical structure;
a coordinator checker configured to monitor reception of a beacon or data from the coordinator to determine whether the coordinator is defective or not;
a coordinator changer configured to, in response to a determination that the coordinator is defective, change a current coordinator to one of devices belonging to a personal area network as a new coordinator
wherein during an inactive period of the PAN coordinator, the device associated with the coordinator transmits a packet to the coordinator and receives a beacon from the coordinator, and
wherein, when the coordinator is defective, one of the devices belonging to the PAN that received the packet transmitted during the inactive period of the PAN coordinator is determined as the new coordinator.

10. The dynamic packet relay apparatus of claim 9, wherein the coordinator checker comprises:
a reception monitor configured to monitor the reception of data or a beacon from the coordinator for a predetermined time period,
an alive-request sender configured to send an Alive Request message to the coordinator, and
a defect determiner configured to, in response to no response to the Alive Request message being received from the coordinator, determine that the coordinator is defective.

11. The dynamic packet relay apparatus of claim 9, wherein the coordinator changer comprises:
a candidate requester configured to broadcast a Coordinator_Candidate Request message throughout a PAN,
a device selector configured to receive Coordinator_Candidate Response messages from devices in the PAN, and select one device that has the best communication quality, based on the analysis of the received Coordinator_Candidate Response messages, and
a change requester configured to send a Coordinator Request message to the selected device.

12. The dynamic packet relay apparatus of claim 11, wherein both the Coordinator_Candidate Request message and the Coordinator Request message contain information about the coordinator and the information about the device associated with the coordinator.

13. The dynamic packet relay apparatus of claim 11, wherein the device in the PAN comprises:
a candidate request receiver configured to receive a Coordinator_Candidate Request message that contains coordinator information and information about a device associated with a coordinator from the PAN coordinator;
a candidate response sender configured to send a Coordinator_Candidate Response message to the PAN coordinator, wherein the Coordinator_Candidate Response message contains information regarding a packet which has been received during an inactive period, the packet being transmitted to the coordinator from a device associated with the coordinator; and
a mode changer configured to, in response to receiving a Coordinator Request message from the PAN coordinator, change a mode of the device to serve as a coordinator from the following frame.

14. The dynamic packet relay apparatus of claim 13, wherein the candidate response sender comprises:
a consistency checker configured to compare a source address in a MAC header of the packet received during the inactive period with an address of the device associated with the coordinator, and compare a destination address with an address of the coordinator, a packet information calculator configured to calculate both a number of packets with source and destination addresses that match the addresses of said device and said coordinator and a value of RSSI, during designated frame periods, and a response generator configured to create a Coordinator_Candidate Response message using the calculated values.

15. The dynamic packet relay apparatus of claim 9, wherein the coordinator comprises:
- a device registration component configured to send a Child_Register message that contains information about a device associated with the coordinator to a PAN coordinator;
- a relay packet receiver configured to transmit a beacon to the associated device and receive, in turn, a packet from the device during an inactive period of the PAN coordinator; and
- a relay packet transmitter configured to transmit the packet to the PAN coordinator during an active period of the PAN coordinator.

16. The dynamic packet relay apparatus of claim 15, wherein the device registration component sends the Child_Register message to the PAN coordinator each time the information about the associated device is changed.

17. The dynamic packet relay apparatus of claim 15, wherein the device associated with the coordinator comprises:
- a beacon checker configured to, in response to no beacon being received from the associated coordinator, stand by for a predetermined time period to receive a beacon, and in response to a beacon being received, determine whether the received beacon was sent from the coordinator or another device; and
- a coordinator updater configured to, in response to a determination that the beacon was sent from another device, updating coordinator information based on information about the device.

* * * * *